Nov. 22, 1932. S. MAGGIO Re. 18,663

TROLLEY HARP AND WHEEL STRUCTURE

Original Filed Aug. 7, 1930

INVENTOR
Salvator Maggio,
by Edward A. Pennica
his attorney.

Reissued Nov. 22, 1932 Re. 18,663

UNITED STATES PATENT OFFICE

SALVATOR MAGGIO, OF PITTSBURGH, PENNSYLVANIA

TROLLEY HARP AND WHEEL STRUCTURE

Original No. 1,811,362, dated June 23, 1931, Serial No. 473,737, filed August 7, 1930. Application for reissue filed May 4, 1932. Serial No. 609,322.

In the present practice the arrangement is such that the current flows from the wheel through the axle to the harp.

In the course of time the rotation of the wheel on the axle results in material wear and the wheel has a loose fit on the axle, thus causing arcing and sparking between the wheel and axle.

In my improved structure the current is taken from the wheel by means of brushes which are spring-pressed against the lateral surfaces of the wheel.

Furthermore, I provide new and improved holders for the brushes and new and improved means for removably mounting the brush holders on the harp.

Again where, as in standard street railway practice, an exposed overhead conductor or trolley wire is used to carry the current, a great deal of difficulty is experienced when the conductor becomes coated with ice, and various ice-cutting or removing devices have been tried but without success commercially.

In my improved structure I provide a new and improved ice-remover having a forked upper end which straddles the conductor from below, the base or bridge of the fork traveling in contact with the conductor. By serrating or ridging the contact surface of the bridge I provide means for scraping the ice from the conductor. The ice-remover is spring-pressed against the conductor and is insulated from the harp so that it does not lead current from the conductor or cause sparking.

As a convenient means for connecting the trolley rope to the harp, I may attach the rope to the lower end of the ice-remover.

The ice-remover also acts as a finder to assist the motorman to replace the trolley wheel upon the conductor when it leaves the same, and said device also acts as a guard which assists the trolley wheel to keep to the conductor on curves or switches and which prevents the trolley pole from flying up towards the vertical when the wheel accidently jumps the conductor.

Other novel features of construction and also of arrangement of parts, will appear from the following description.

In the accompanying drawing, wherein I have illustrated a practical embodiment of the principles of my present invention, Fig. 1 is a side elevation of the trolley-harp, the wheel and the ice-scraper or finder-guard.

Figure 1:
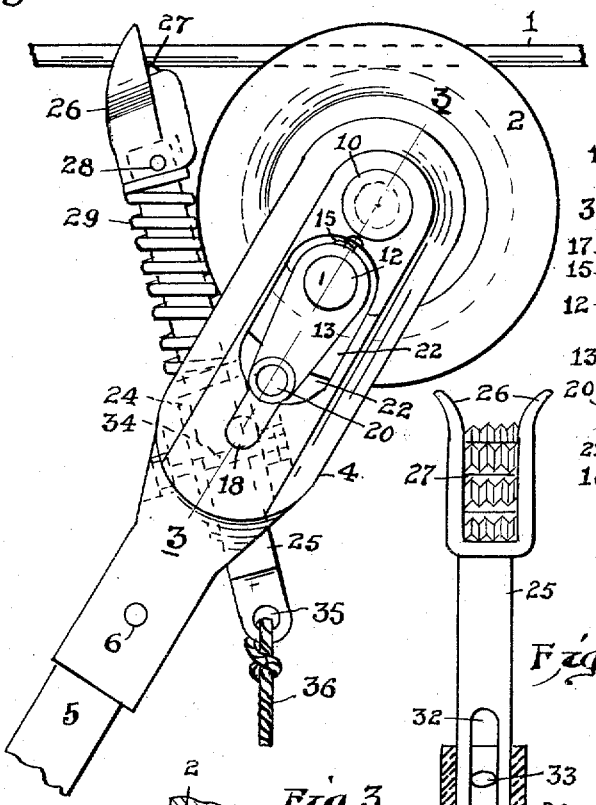
Figure 2:
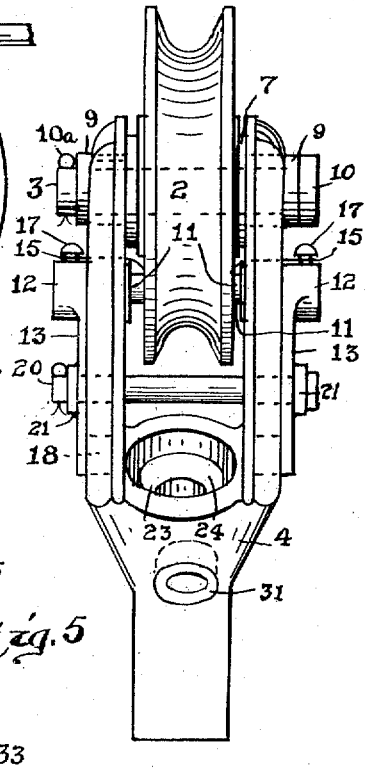
Fig. 2 is a rear elevation of the same, the ice-cutter being omitted.
Figure 5:
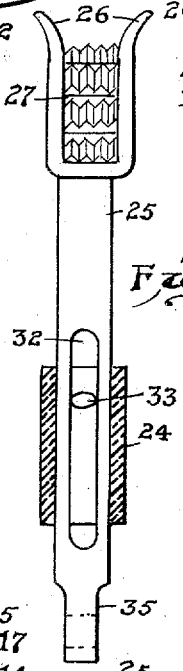
Fig. 5 is a detail view showing the ice-cutter and a portion of its mounting.
Figure 3:
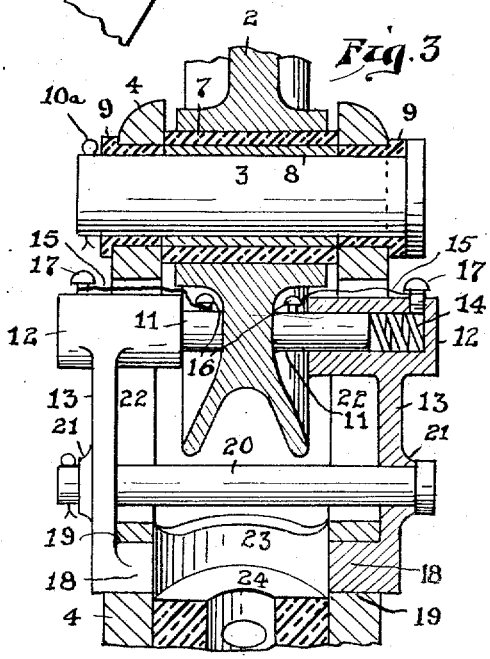
Fig. 3 is an enlarged section taken along the line 3—3 in Fig. 1.

Referring to the drawing, 1 represents the overhead conductor in contact with which the grooved trolley wheel 2 travels. The wheel 2 rotates with the axle 3 as an axis, which axle is mounted on the arms of the harp 4. The base of the harp is provided with a cylindrical socket in which the upper end of the trolley pole 5 is inserted. The pole is secured in the socket, as by the rivet-pin 6.

The wheel is preferably insulated from the axle. Thus 7 represents a bushing of fibre or other insulating material which is fixed, as by a drive fit in the hub-bore of the wheel. The ends of the bushing extend beyond the hub of the wheel and thus prevent contact of the latter with the arms of the harp.

8 represents a brass bushing fixed within the insulating bushing 7 and arranged to rotate on the axle 3 between the arms of the harp.

9 represents relatively short insulating bushings driven into the alined axle holes in the arms of the harp and having annular heads or flanges at their outer ends to limit their inward movement.

One end of the axle is provided with a head 10 and the other end of the axle is provided with a cotter-pin 10*a* to prevent longitudinal movement of the axle.

The wheel is thus thoroughly insulated from the axle and also from the harp except its electrical connection with the latter through the brush and brush-holders as will next be explained.

The current is taken from the wheel by means of the two copper brushes 11 whose inner ends are resiliently held in contact with the opposite lateral surfaces of the wheel. The outer ends of the brushes are stepped in the cylindrical sockets 12 which form the upper ends of the two brush-holders 13.

In the inner or closed ends of the sockets are seated the helical springs 14 which press the brushes against the wheel. To protect the springs against injury, the current is by-passed around these springs by means of the short conductor wires 15 whose inner ends are secured to posts 16 screwed into threaded holes in the brushes near their contact ends and whose outer ends are secured to like posts 17 screwed into threaded holes in the upper ends of the holders.

Figure 4:
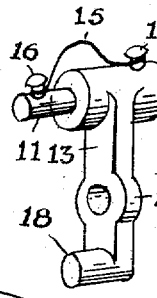
Fig. 4 is a view in perspective showing one of the two brush-holders.
Figure 6:
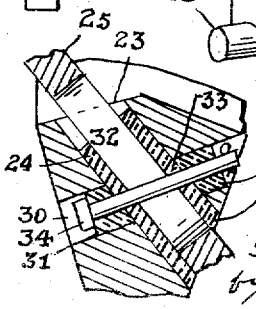
Fig. 6 is a sectional detail of the same.

One of the two brush-holders is illustrated in Fig. 4. The lower ends of the holders are provided with the gudgeons 18 which fit into the sockets 19 formed in the harp. The two opposed brush-holders are removably held in position relative to the harp. Thus I have provided a cross pin 20 which extends through the alined hubs 21 formed intermediate of the ends of the holders, one end of the pin being provided with a head and the other end with a cotter pin. A bolt and nut may be substituted for the pin 20.

Clearance is provided for the sockets 12 and the cross pin 20 by the provision of longitudinally elongated openings 22 in the arms of the harp.

It is obvious that the current is thus conducted from the wheel through the brushes and the brush-holders directly to the lower portion of the harp, and thus any wear or looseness between the wheel and the axle will not interfere with the travel of the current or cause arcing or sparking.

The base portion of the harp is provided with a bore 23 disposed in substantially the angular relation to the axis of the harp indicated in Fig. 1. 24 represents a bushing of fibre or other insulating material fixed in said bore. The cylindrical stem 25 of the ice-cutter is slidably mounted in said bushing and is thus insulated from the harp and the trolley wheel.

The upper end or head of the ice-cutter is bifurcated to provide the twin arms 26 which straddle the conductor 1 from below and the bottom or bridge of the fork is preferably provided with a serrated surface 27 which removes the ice from the conductor. The head may be of brass and be mounted on the upper end of the steel stem 25 as by a rivet 28.

The ice-cutter is held in resilient contact with the conductor, as by means of the helical spring 29 coiled about the stem with its lower end bearing against the harp and its upper end bearing against the head of the cutter.

Means are provided to limit the longitudinal movement of the cutter relative to the harp. Thus a cross bore 30 in the harp intersects the bore 23 and is provided with the insulating bushings 31. The stem 25 is provided with a longitudinally elongated or slotted hole 32 and the bushing 24 is provided with a hole 33 alined with the bores of the bushings 31. 34 represents a pin extending through the bushings 31, the hole 33 in the bushings 24 and the slotted hole 32 in the stem 25. The pin is provided at one end with a head and at the other end with a cotter pin.

It is obvious that the ice-cutter is thoroughly insulated from the harp and thus will not convey current. Thus there will be no arcing nor sparking between the cutter and the conductor.

The lower end of the stem 25 protrudes below the harp and is provided with an eye 35 to which the trolley rope 36 is tied.

Thus the ice-cutter provides convenient means whereby the motorman may place the trolley wheel in engagement with the conductor or remove it from the latter. Again the device acts as a guard to prevent the wheel jumping from the conductor as on curves or at switches. In case the wheel should jump the conductor, the ice-cutter remains in contact with the latter, thus preventing damage by the upwardly flying trolley pole and facilitating the replacement of the wheel in contact with the conductor.

What I claim is:—

1. In a trolley harp and wheel structure, the combination of the harp, an axle mounted in the arms of the harp and insulated therefrom, a metallic bushing rotatably mounted on the axle, a wheel mounted on the bushing and insulated therefrom and from the harp, and a brush engaging the wheel and electrically connected to the harp.

2. In a trolley harp and wheel structure, the combination of the harp, a wheel rotatably mounted between the arms of the harp and insulated therefrom, the harp being provided with a seat, a brush holder having one end provided with a gudgeon which engages the seat and having its other end provided with a socket, and a brush carried by said socket and having its end spring-pressed against the wheel.

3. In a trolley harp and wheel structure, the combination of the harp, a wheel rotatably mounted between the arms of the harp and insulated therefrom, the harp being provided with a seat, a brush holder having one end provided with a gudgeon which engages the seat, having its other end provided with a socket, and a brush carried by said socket and having its end spring-pressed against the wheel, and means for detachably securing the brush holder in position relative to the harp.

4. In a trolley harp and wheel structure, the combination of the harp, a wheel rotatably mounted between the arms of the harp and insulated therefrom, the harp being provided with sunken seats at either side, a pair of brush holders having their one ends provided with gudgeons which engage said seats and their other ends provided with brush sockets, means for securing the brush holders in place relatively to the harp, and brushes carried by said sockets and spring-pressed against the wheel.

5. In a trolley harp and wheel structure, the combination of the harp, a wheel rotatably mounted between the arms of the harp and insulated therefrom, the harp being provided with sunken seats at either side, a pair of brush holders having their one ends provided with gudgeons which engage said seats and their other ends provided with brush sockets, a cross member securing the holders together and to the harp, and brushes carried by said sockets and spring-pressed against the wheel.

6. In a trolley harp and wheel structure, the combination with the harp and the wheel rotatably mounted between the arms of the harp and the harp being provided with a bore disposed at an angle to the axis of the harp, of a member comprising a bifurcated head arranged to straddle the overhead conductor from below and in advance of the wheel and a stem longitudinally slidable in said bore, and means for resiliently pressing the head into contact with the conductor.

7. In a trolley harp and wheel structure, the combination with the harp and the wheel rotatably mounted between the arms of the harp and the harp being provided with a bore disposed at an angle to the axis of the harp, of a member comprising a bifurcated head arranged to straddle the overhead conductor from below and in advance of the wheel and a stem longitudinally slidable in said bore, means for resiliently pressing the head into contact with the conductor, and means whereby the member is electrically insulated from the harp.

8. In a trolley harp and wheel structure, the combination with the harp and the wheel rotatably mounted between the arms of the harp and the harp being provided with a bore disposed at an angle to the axis of the harp, of a member comprising a bifurcated head arranged to straddle the overhead conductor from below and in advance of the wheel and a stem longitudinally slidable in said bore, means for resiliently pressing the head into contact with the conductor, and means for limiting the longitudinal movement of the member relative to the harp.

9. In a trolley harp and wheel structure, the combination with the harp and the wheel rotatably mounted between the arms of the harp and the harp being provided with a bore disposed at an angle to the axis of the harp, of a member comprising a bifurcated head arranged to straddle the overhead conductor from below and in advance of the wheel and a stem longitudinally slidable in said bore, means for resiliently pressing the head into contact with the conductor, and means for attaching a trolley rope to the lower end of the member.

10. In a trolley harp and wheel structure, the combination with the harp and the wheel rotatably mounted between the arms of the harp and the harp being provided with a bore disposed at an angle to the axis of the harp, of a member comprising a bifurcated head arranged to straddle the overhead conductor from below and in advance of the wheel and a stem longitudinally slidable in said bore, means for resiliently pressing the head into contact with the conductor, means for attaching a trolley rope to the lower end of the member, and means for limiting the longitudinal movement of the member relative to the harp.

11. In a trolley harp and wheel structure, the combination with the harp and the wheel rotatably mounted between the arms of the harp, of a member comprising a bifurcated head which is arranged to straddle the overhead conductor from below and in advance of the wheel, and a stem which is mounted for longitudinal movement relative to the harp, means for spring-pressing the member into engagement with the conductor, and means for electrically insulating the member from the harp.

12. In a trolley harp and wheel structure, the combination with the harp and the wheel rotatably mounted between the arms of the harp, of a member comprising a bifurcated head which is arranged to straddle the overhead conductor from below and in advance of the wheel, and a stem which is mounted for longitudinal movement relative to the harp, means for spring-pressing the member into engagement with the conductor, and means for attaching a trolley rope to the lower end of the member.

13. In a trolley harp and wheel structure, the combination with the harp and the wheel rotatably mounted between the arms of the harp, of a member comprising a bifurcated head which is arranged to straddle the overhead conductor from below and in advance of the wheel, and a stem which is mounted for longitudinal movement relative to the harp, means for spring-pressing the member into engagement with the conductor, means for limiting the longitudinal movement of the member relative to the harp, and means for attaching a trolley rope to the lower end of the member.

14. In a trolley harp and wheel structure, the combination of the harp, a wheel rotatably mounted between the arms of the harp, the harp being provided with a seat, a brush holder having one end provided with a gudgeon which engages the seat and having its other end provided with a socket, and a brush carried by said socket and having its end spring-pressed against the wheel.

15. In a trolley harp and wheel structure, the combination of the harp, a wheel rotatably mounted between the arms of the harp, the harp being provided with a seat, a brush holder having one end provided with a gudgeon which engages the seat, having its other end provided with a socket, and a brush carried by said socket and having its end spring-pressed against the wheel, and means for detachably securing the brush holder in position relative to the harp.

16. In a trolley harp and wheel structure, the combination of the harp, a wheel rotatably mounted between the arms of the harp, the harp being provided with sunken seats at either side, a pair of brush holders having their one ends provided with gudgeons which engage said seats and their other ends provided with brush sockets, means for securing the brush holders in place relatively to the harp, and brushes carried by said sockets and spring-pressed against the wheel.

17. In a trolley harp and wheel structure, the combination of the harp, a wheel rotatably mounted between the arms of the harp, the harp being provided with sunken seats at either side, a pair of brush holders having their one ends provided with gudgeons which engage said seats and their other ends provided with brush sockets, a cross member securing the holders together and to the harp, and brushes carried by said sockets and spring-pressed against the wheel.

Signed at Pittsburgh, Pennsylvania, this 27th day of April, 1932.

SALVATOR MAGGIO.